3,374,222
SEPARATING LEVOGLUCOSAN AND CARBOHYDRATE DERIVED ACIDS FROM AQUEOUS MIXTURES CONTAINING THE SAME BY TREATMENT WITH METAL COMPOUNDS
Quintin P. Peniston, Bainbridge Island, Wash., assignor to Weyerhaeuser Company, Tacoma, Wash., a corporation of Washington
Continuation-in-part of application Ser. No. 325,658, Nov. 22, 1963. This application July 6, 1965, Ser. No. 471,502
14 Claims. (Cl. 260—209)

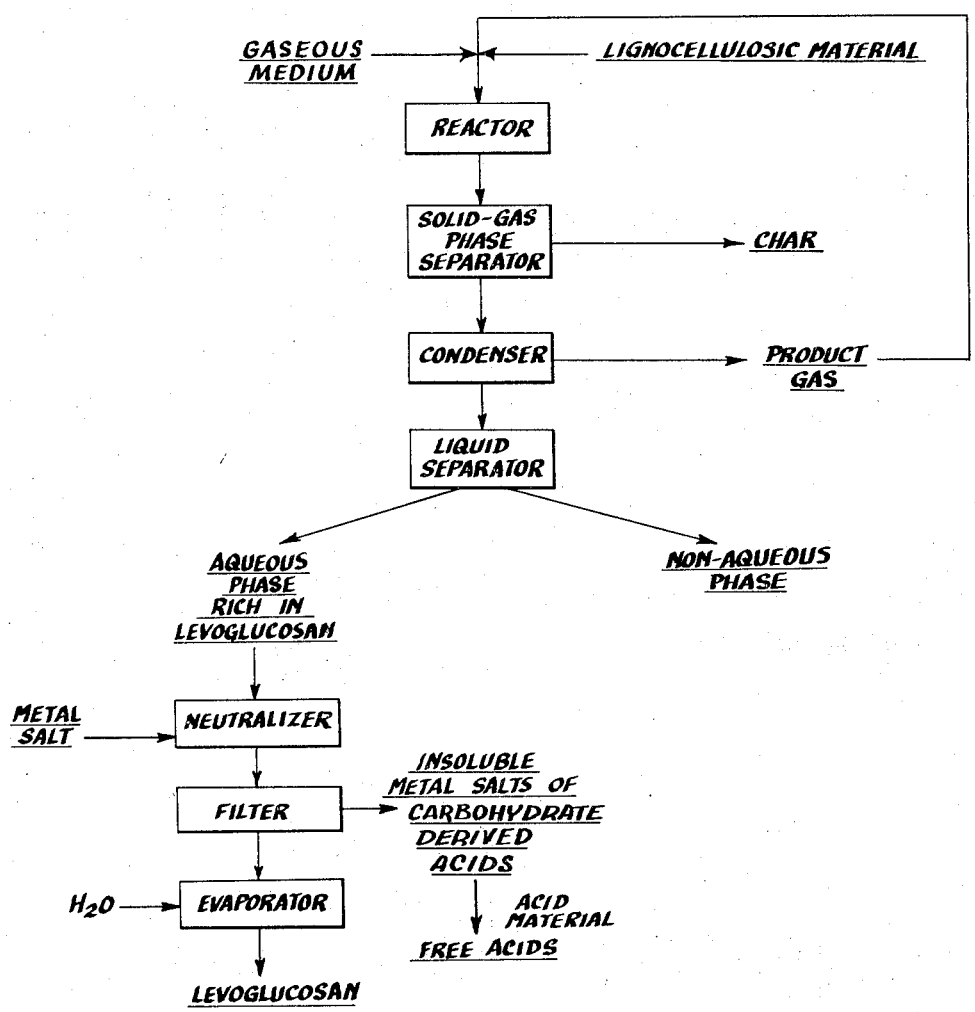

This is a continuation-in-part of my application Ser. No. 325,658 filed Nov. 22, 1963, now abandoned.

This invention relates to the separation of levoglucosan and carbohydrate derived acids from aqueous mixtures in which they are contained.

Levoglucosan is a chemical potentially useful as a raw material for the large scale production of plasticizers, explosives, propellants, surfactants, plastics, resins and other products. The low molecular weight carbohydrate derived acids, including principally saccharic and saccharinic acids, are ueful potentially as raw materials for the synthetic organic chemical industry, and also as substitutes for citric acid in the foodstuffs industry.

Both levoglucosan and the carbohydrate derived acids are of special interest since they are derivable from wood and other lignocellulose materials of very low cost. Their production accordingly affords a possible commercial utilization of waste wood products such as sawdust, chips, flakes and shavings.

Although it heretofore has been recognized that lignocellulose materials may be converted by pyrolysis to degradation products containing levoglucosan and carbohydrate derived acids, the commercial application of this knowledge has been retarded by the difficulty of separation of these two products. As a sugar derivative, levoglucosan is difficult to isolate in crystalline form from complex aqueous mixtures in which it is contained. Furthermore, conventional fractionation procedures are difficult to apply to the separation of the carbohydrate derived acids from levoglucosan.

It, therefore, is the general purpose of the present invention to provide a commercially applicable process for the separation of levoglucosan and the carbohydrate derived acids from aqueous mixtures in which they are contained, both products being recovered in high yields and in commercially useful form.

The process of the invention is based upon the discovery that the high molecular weight carbohydrate derived acids in contradistinction to levoglucosan, largely form water-insoluble compounds with various inorganic metal salts, thus providing an effective means for removing the acids from the levoglucosan. After removal of these carbohydrate derived acids, the levoglucosan solution may be concentrated to a level at which the levoglucosan will crystallize readily. It then may be separated in high yields as a white crystalline product applicable to its various uses.

The water-insoluble carbohydrate derived acid salts, which form the other principal product of the procedure, may be converted by treatment with a suitable acid material to the free acids, in which form they also are applicable to their several uses.

Although the aqueous mixture containing dissolved levoglucosan and carbohydrate derived acids which is the subject matter of the present invention may be derived from various sources, it is contemplated particularly that its source shall be the pyrolytic degradation of lignocellulose materials under controlled conditions favoring the production of levoglucosan, which is a first product of the degradation, and minimizing its secondary conversion to tar, char and gaseous products. When this is the case, there is obtained as a product of the pyrolysis an aqueous mixture containing levoglucosan and carbohydrate derived acids which is particularly well suited to the herein described separation.

Accordingly, as raw materials for the presently described process, there may be employed such lignocellulose materials as sugarcane bagasse, cornstalks, corn cobs, the barks of trees and, particularly, the wood of various species of trees. Thus, there may be employed such waste wood products as sawdust, wood chips, wood flakes and wood shavings which are available in very large quantity at low cost and which presently comprise waste byproducts of the lumber industry.

When used as described herein, the lignocellulose raw material need not be pretreated, as by prehydrolyzing or solvent extracting. However, it should be reduced in size to the form of small pieces which are suspendable in a gaseous medium. Although the size of the pieces is subject to some variation, a product which will pass a 4-mesh sieve, U.S. Sieve Series, is suitable for the present purpose. Where sawdust is the starting material, it advantageously may be passed through a screen in order to screen out any large splinters or other large pieces which might interfere with the processing of the material.

It also is desirable to control the moisture content of the lignocellulose starting material to a level of less than 5% by weight. This is desirable in order to avoid the economic loss which would result from vaporizing a large amount of water. It also is desirable in order to maintain the temperature within the reactor at the desired and necessary levels.

The drying of the material may be accomplished in any suitable manner, preferably by suspension drying in hot gases, or merely by air drying, to a moisture content of from 2–5%.

As is indicated in the drawing, which consists of a flow plan of the present procedure, the first step in the procedure is introducing the sawdust or other lignocellulose starting material and a suitable gaseous medium into a reactor. Although a variety of gases may be employed for this purpose, the one selected should be substantially free of oxidizing effects under the pyrolytic conditions, nonexplosive, and preferably nontoxic. Suitable gases accordingly comprise nitrogen, carbon dioxide, steam and product gas, i.e., the non-condensable gaseous product resulting from the pyrolytic degradation of the lignocellulose.

Steam may be employed to advantage as a gaseous medium since it has a high heat capacity and heats the lignocellulose rapidly to the reaction temperature. Also during the condensation of the condensable gases in the product, the steam is converted to water and helps to complete the condensation of tar aerosols or smokes which are present in substantial proportion and which are difficult to condense. Still further, by controlling the amount of steam used as a carrier, the degree of dilution of the aqueous phase product may be controlled as required for further processing.

When steam is used, however, it should be employed as superheated steam rather than as saturated steam. This is desirable to insure proper heating and also to prevent excessive water dilution of the product.

The noncondensable gaseous product of the pyrolytic reaction, i.e., "product gas," also may be employed to advantage as a gaseous medium. Although its composition is somewhat variable, it comprises predominantly carbon dioxide, carbon monoxide, methane and small amounts of unsaturated hydrocarbons. These gaseous products are produced in sufficient quantity to serve as a suspending and entraining medium, to fill the system completely, and to make up any gas losses.

Whatever its identity, the carrier gas is preheated to a temperature sufficient to bring the lignocellulose material to pyrolyzing temperature when it is mixed with the gas. Accordingly, it is preheated to a temperature which when it is mixed in the predetermined ratio with the solid particles of lignocellulose will bring the particles within the range of, broadly, from 600°–1500° F.

The gas-to-particle ratio employed is dependent upon various factors such as the nature and capacity of the reactor employed, the identity of the lignocellulose, the size of the lignocellulose pieces and the procedure by which the reaction products are processed. Sufficient gas must be employed to suspend and transport the particles through the processing stages. On the other hand, if too high a proportion of gas is employed, the procedure becomes uneconomical and it becomes difficult to fractionate the products of the reaction.

In general, a ratio of from 20 to 150 standard cu. ft. of gas for each pound of lignocellulose, may be employed.

The reactor into which the gas and solid particles are introduced may be of any type suitable to contain a pyrolytic reaction of the character contemplated. In general, it comprises a chamber of size sufficient to give the desired dwell time and provided with an inlet for the gaseous stream and the product to be pyrolyzed, and an outlet for passage of the char and gaseous products of reaction.

Means are associated with the reactor for controlling its temperature carefully, since the temperature is critical in determining the yield of levoglucosan product. Such means may include means for applying heat, particularly where the raw material has a high moisture content.

Also, if desired, means may be provided for evacuating the reaction chamber since it has been found that when the pyrolysis is carried out under a vacuum of less than 100 mm., preferably less than 25 mm., the yield of char is decreased and the yield of liquid products including levoglucosan is increased materially. Other advantages of operating under diminished pressure are: rapid removal of the products, and the possibility of varying and controlling the product yields within wide limits.

If desired, a reactor of the fluidized bed type may be employed for achieving the foregoing purposes. In such a reactor the particles of lignocellulose and heated gas are introduced together or separately at relative rates such as to establish a zone wherein is present an agitated or fluidized bed of the particles. As the pyrolysis proceeds, the solid particles are converted to char which, being relatively light, is carried out of the reactor by the gas stream.

Also, by regulating the velocity of the stream relative to the dimensions of the reactor and the rate of feed of the materials put into the reactor, the gaseous products of the reaction may be removed from the reaction zone substantially as soon as they are formed, i.e., within a matter of a few seconds. As pointed out above, this is critical if pyrolytic degradation of the levoglucosan product is to be prevented and a high yield of that product obtained.

The temperature prevailing within the reactor is maintained within a range of, broadly, from 600–1500° F. To cause the production of a particularly high yield of levoglucosan, the reactor temperature preferably is maintained within the range of 700–1100° F.

By adjustment of the gas flow rate the exposure of the pyrolysis gases to high temperature is kept at a minimum, since they are swept from the reactor substantially as soon as they are formed. It thus is possible to secure a time-at-temperature of the gaseous product not exceeding 30 seconds, preferably from not exceeding 15 seconds, the selected reaction time depending primarily upon the particle size and the temperature of pyrolysis. This is in sharp contrast to the old wood carbonizing techniques which required many hours to complete.

Maintaining the reaction time at a relatively low value prevents excessive char formation and minimizes the occurrence of secondary reactions of decomposition or repolymerization of the levoglucosan. In other words, as between the competing reactions occurring in the reactor, rapid removal of the levoglucosan is critical in favoring the conversion of cellulose to levoglucosan and preventing the further decomposition or change of that product into unwanted by-products.

Although it is necessary to remove the condensable gas component of the reaction product rapidly from the reactor, the same consideration does not apply to the solid component, i.e., to the char, which may be maintained in the reaction zone for a longer period of time. This is a situation which may occur in an activated bed reactor in which the gaseous reaction product is withdrawn substantially immediately while the solid component may remain within the reactor for a longer period of time until its conversion to char and gaseous products has been completed.

Although the composition of the product leaving the reactor is somewhat variable, it contains broadly from 10 to 50% by weight char, from 15 to 60% fixed noncondensable gases and from 20 to 65% condensable gases. This mixture is processed for separation of its components.

As indicated in the flow plan, the first stage in the separation comprises passing the mixture through a solid-gas phase separator which may comprise a cloth filter, a centrifuge, or, preferably, a cyclone separator. During the separation the separator is kept hot, at a temperature above the condensation temperature of the condensable gases, in order to eliminate plugging of the separator elements with tar and to prevent loss of valuable volatile products. Also, the dwell time in the hot separator is kept at a minimum, i.e., not over a few seconds, in order to prevent or minimize decomposition of the levoglucosan.

The solid product leaving the separator comprises char, which has a fixed carbon content of the order of 65–90% by weight in the event that the conversion of the lignocellulose starting material in the reactor has been substantially complete. The fixed carbon level may be varied by control of the operating variables, however, as determined by the end use to which the product is to be put. Thus when it is to be used as absorption charcoal it should be substantially free from tar. However, if it is to be applied to the manufacture of fuel briquets, a lower carbon content is permissible, the increased tar content serving as an adhesive to bind the char particles into briquets.

The gaseous product leaving the solid-gas phase separator comprises both condensable and noncondensable gases. It next is processed for separating these two classes of gaseous products.

Accordingly, it is passed through a condenser unit which, for efficient recovery of the condensable materials, may comprise a battery of individual, water-cooled, corrosion-resistant condensers connected in series. As noted above, where superheated steam comprises the carrier gas, the steam condensed into water at this stage serves to dilute the condensed product to a degree which renders it suitable for further processing.

As products of the condensing stage, there are obtained a gaseous product, i.e., "product gas," and a liquid product.

The product gas is obtained in a yield of 15 to 60% by weight, based on the dry starting material. It contains carbon dioxide, carbon monoxide, methane and other saturated hydrocarbons, and a small amount of ethylene and other unsaturated hydrocarbons. Its exact composition varies, depending primarily upon the temperature of the pyrolysis. Typical compositions when pyrolyzing Douglas fir sawdust at 850 and 1100° F., respectively, are given below, in weight percent.

| Temp. °F. | Carbon Dioxide | Carbon Monoxide | Saturated Hydrocarbons as Methane | Unsaturated Hydrocarbons as Ethylene | Oxygen |
|---|---|---|---|---|---|
| 850 | 30 | 50 | 12 | 3 | 1.5 |
| 1100 | 40 | 35 | 18 | 2 | 1 |

The product gas thus obtained has several important potential applications. In view of its high carbon monoxide content it may be used as a fuel or, after washing out its carbon dioxide content with lime, as a raw material for carbon monoxide synthesis. In the alternative, the product gas may be employed without fractionation or further treatment as the carrier gas required for the presently described pyrolysis.

The liquid product is obtained in the first instance as a brown liquid which separates upon standing into a nonaqueous phase and an aqueous phase. These two phases may be separated by processing the total liquid product in a liquid separator of suitable construction. This results in the separation of a nonaqueous phase fraction comprising about 20 to 60% by weight of the total liquid product and an aqueous phase fraction comprising from 40 to 80% of the total liquid product.

The nonaqueous phase consists principally of tars and phenolic bodies such as a guaiacol, the cresols, cresol, and the higher phenols. They are obtained in a yield of from 4 to 35% by weight, based on the dry weight of the starting material, and may be applied to the various industrial uses to which such materials are applicable either as a gross product or after fractionation.

The aqueous phase is made up of a solid component dissolved in an aqueous liquid. The aqueous liquid comprises principally water, but includes also appreciable quantities of formic acid, acetic acid, and soluble phenols.

The solid fraction of the aqueous phase represents from 14 to 38% by weight of the dry lignocellulose and consists of various carbohydrate fragments including levoglucosan and carbohydrate derived acids of two classes. The first class includes principally those acids derived from carbohydrates which form insoluble salts when reacted with inorganic metal compounds. These may include humic acids and oxidized polymeric carbohydrate material. The second class includes those acids of relatively low molecular weight which do not form such salts and may include saccharic, saccharinic and aldonic acids.

The levoglucosan may be separated from the carbohydrate derived acids of the first class by taking advantage of the selective ability of the latter to form insoluble salts when reacted with inorganic metal compounds.

Accordingly, the gross aqueous phase first may be washed, if necessary, with a low molecular weight aliphatic organic solvent such as the amyl alcohols, ethyl acetate, butyl acetate, diethyl ether, methyl isopropyl ether and the like. These remove preferentially the small quantities of phenolic materials or tars which might be present and might interfere with the subsequent separation.

The aqueous liquor, with or without having been washed with organic solvent, is diluted to a solids content of from 15–25% by weight and treated preferably in two stages with an inorganic metal compound having the property of forming water insoluble salts of the polymeric carbohydrate derived acids. Such metal compounds include particularly the water-soluble, basic-acting compounds of calcium, barium, strontium, magnesium, aluminum, lead and zinc. Because of its availability and effective action, hydrated or dehydrated lime is a preferred compound for this use.

The inorganic metal compound is mixed with the aqueous phase in an amount which is substantially equivalent to the carbohydrate derived acid content of the liquor. This should raise the pH of the liquor to a level of approximately 12 or higher. If not, sufficient alkaline material should be added to raise the pH to this level. At this pH the acids are converted entirely to the form of their water insoluble salts, which precipitate from the liquor. Their precipitation is made more complete by cooling the mixture to 35–60° F. in this, the first stage of the precipitation.

To facilitate the subsequent separation in the second stage of the precipitation it is preferred further to dilute the aqueous liquor to a solids content of from 5–15% by weight. It also is preferred to heat the diluted mixture to a temperature of from 100–212° F. for a time sufficient to aggregate the solid precipitate into particles which are readily filterable for separation of the precipitated component.

The precipitated mixture then is passed through a suitable filter, centrifuge, or other solid-liquid phase separating means which results in the formation of two fractions.

The first fraction comprises the water insoluble metal salts of the polymeric carbohydrate derived acids. These may be treated with an acid material to liberate the free acids. Where lime is the metal compound used to neutralize the acids, the resulting calcium salts may be suspended in water, after which dilute sulfuric acid is added to the suspension to form a water solution of the free acids and insoluble calcium sulfate.

The calcium sulfate precipitate then may be removed by filtration, washed, and the solution of carbohydrate derived acids processed for recovery of the free acids, or for their conversion to desired chemical derivatives.

The combined yield of the precipitated carbohydrate derived acids thus obtained, may be of the order of 6–15% based on the oven dry weight of the lignocellulose starting material.

The second fraction comprises a levoglucosan-containing solution from which most of the carbohydrate derived acids have been removed, but which still contains appreciable quantities of low molecular weight acids which do not form water insoluble salts with metal compounds.

Such acids may be removed in any suitable manner, as by passing the liquor through a cation exchange column to remove any calcium or other cations which may be present, and then through an anion exchange column of suitable content for removal of the acids. This gives as a product a levoglucosan-containing liquor which may be concentrated for separation of the levoglucosan as a solid, crystalline product.

If this is desired, the liquor is concentrated by evaporation under a vacuum of less than 50 mm., this being sufficient to distill off the water at a temperature of not over 70° F. Decomposition of the levoglucosan is thus avoided.

The concentration is continued until the liquor has attained a levoglucosan concentration of at least 70%. It then is cooled, with or without seeding with crystals of levoglucosan, with the result that a white crystalline levoglucosan product is obtained. This is separated from the mother liquor by filtration. It may be obtained in a yield of as much as 15–30% based on the oven dry weight of the lignocellulose starting material.

The process of the invention is illustrated in the following examples:

*Example I*

An aqueous mixture containing dissolved levoglucosan and carbohydrate derived acids was prepared from Douglas fir sawdust.

The sawdust, screened to −4 mesh, U.S. Sieve Series, and having a moisture content of about 5%, was mixed continuously with hot product gas, using a gas:wood ratio of about 95 standard cubic feet of gas for each pound of sawdust. The gas was preheated to a temperature of 1500° F.

The resulting suspension of sawdust particles in gas was passed continuously into an agitated bed reactor equipped with heating means for maintaining a reaction temperature of 750 to 800° F.

As the pyrolysis proceeded, the gaseous products of the reaction were withdrawn continuously from the reactor after a residence time of about 2 seconds.

The total product comprising char, condensable gases and condensed gases was passed quickly through an insulated cyclone separator maintained at a temperature just above the condensation temperature of the condensable gases contained in the product. This resulted in the separation of a char product containing about 70% fixed carbon, in a yield of 20% by weight, based on the weight of the original starting material, oven dry basis.

The gaseous product leaving the cyclone was passed through a series of water-cooled condensers which separated the condensable gases from the noncondensable gases. The latter were obtained in a yield of 15% by weight starting material and had the following percent by weight composition:

| | |
|---|---|
| Carbon monoxide | 43 |
| Carbon dioxide | 43 |
| Saturated hydrocarbons as methane | 8 |
| Unsaturated hydrocarbons as ethylene | 2 |
| Oxygen | 1 |

The condensable gases were condensed to a brown liquid which separated into aqueous and nonaqueous phases. These were separated. The nonaqueous phase represented 21% and the aqueous phase 79% by weight of the total liquid product.

The nonaqueous phase comprised a mixture of tars and substituted phenolic materials.

The aqueous phase had the following percent by weight composition:

| | |
|---|---|
| Water | 25 |
| Volatile acids as acetic acid | 2 |
| Carbohydrate derived acids | 42 |
| Levoglucosan | 31 |

The aqueous phase then was processed for separation of its content of levoglucosan and carbohydrate derived acids. To this end it was diluted with water to a solids content of 20%, after which it was washed with ethyl acetate for the removal of small quantities of tars and phenolic materials.

The washed liquor was cycled to a neutralizer and treated at a temperature of 41° F. with an amount of lime which was substantially equivalent to the acid content of the liquor. This resulted in the precipitation of the calcium salts of the polymeric carbohydrate derived acids.

The resulting reaction mixture was diluted with water to solids content of 10%, after which is was heated to 140° F. for 30 minutes in order to coagulate the precipitated salts. The resulting mixture was filtered, the residue washed and the washings added to the filtrate.

The residue then was taken up in water to a solids content of 20%, after which dilute sulfuric acid was added to the resulting suspension. This precipitated calcium sulfate and formed an aqueous solution of the free carbohydrate derived acids. This solution was separated and evaporated to a solids content of 80%. The yield of acids was 9%, oven dry sawdust basis.

The aqueous liquor from which the acid materials had been precipitated was passed successively through cation and anion exchange columns to remove first the calcium and then a small amount (about 3%, dry sawdust weight basis) of residual carbohydrate derived acids which had not been removed by the lime treatment.

The remaining liquor passed to a vacuum evaporator which was evacuated to about 20 mm. pressure, at which it was possible to distill off the water at a temperature of approximately 70° F. The distillation was continued until a levoglucosan solids content of 80% had been obtained. The liquor then was crystallized continuously, with back feeding of the liquor, to form a solid, white, crystalline levoglucosan product. The yield was 16% by weight, on the basis of the oven dry sawdust starting material.

*Example II*

This example illustrates separation of the levoglucosan from the polymeric carbohydrate derived acids, using aluminum hydroxide as the inorganic metal compound.

A quantity of levoglucosan-containing aqueous phase was produced by pyrolyzing Douglas fir sawdust, condensing the effluent gases and separating the condensed aqueous phase from the condensed nonaqueous phase, as set forth in Example I.

100 parts by weight of the aqueous phase having a solids content of about 30% by weight was treated with 25 parts of aluminum hydroxide which had been prepared by reacting aluminum sulfate with barium hydroxide.

A voluminous floc was formed which contained the aromatic, resinous and polymeric content of the aqueous phase, together with some carbohydrate derived acids. The absorbed solids, which represented 16.6 parts or 55% of the oven dry solids in the sample, then were recovered quantitatively by filtering off the precipitate and forming a slurry of the resulting filter cake in aqueous sodium carbonate solution. The slurry had a consistency of 20%. It was heated until the filter cake had disintegrated, resulting in the separation of the solid materials which had been absorbed by the aluminum hydroxide.

The filtration resulting from the filtration step contained the levoglucosan content of the original sample. It was purified by pouring it over activated carbon and then concentrating it under a vacuum at about 20 mm. pressure and 70° F. until a levoglucosan solids content of 80% had been obtained. The levoglucosan then was crystallized by seeding the concentrated liquor. The yield was 6.5 parts, or 21% by weight of the oven dry solids in the sample.

*Example III*

The procedure of Example II was repeated, but using as the precipitating or flocculating agent lead hydroxide formed by the reaction of lead acetate with barium hydroxide.

The procedure again resulted in the selective precipitation of the aromatic, resinous and polymeric materials, together with some carbohydrate derived acids, leaving a solution from which levoglucosan could be separated readily in crystal form by vacuum concentration, followed by crystallization.

Having thus described the invention in preferred embodiments, what is claimed as new and desired to protect by Letters Patent is.

I claim:
1. The process of separating aqueous mixtures containing dissolved levoglucosan and carbohydrate derived acids, the process comprising:
   (a) adding to the mixture at least the equivalent amount with reference to the acid content thereof, of either an alkaline earth, aluminum, lead or zinc compound forming water insoluble salts of the acids,
   (b) separating the resulting water insoluble carbohydrate derived acid salts from the resulting aqueous solution of levoglucosan,
   (c) concentrating the aqueous solution of levoglucosan,
   (d) and crystallizing from the concentrated solution a solid, crystalline, levoglucosan product.

2. The process of claim 1 including as a preliminary operation the step of washing the mixture with an organic solvent for tars prior to adding the inorganic metal compound.

3. The process of claim 1 wherein the metal compound comprises a member of the group consisting of the water-soluble, basic-acting compounds of calcium, barium, strontium, magnesium, aluminum, lead and zinc.

4. The process of claim 1 wherein the metal compound comprises lime.

5. The process of claim 1 wherein the metal compound comprises lime added in amount sufficient to adjust the pH of the mixture to a minimum value of approximately 12.

6. The process of claim 1 including the step of taking up in water the separated, water-insoluble salts and treating them with acid for their conversion to the free carbohydrate derived acids.

7. The process of claim 1 wherein the metal salt is lime and including the steps of taking up in water the separated water-insoluble carbohydrate derived acid salts, treating them with sulfuric acid for their conversion to the free carbonhydrate derived acids, and separating the resulting calcium sulfate from the resulting aqueous solution of free acids.

8. The process of claim 1 wherein the metal compound comprises aluminum hydroxide.

9. The process of claim 1 wherein the metal compound comprises lead hydroxide.

10. The process of claim 1 including the step of concentrating the aqueous solution of levoglucosan by vacuum evaporation.

11. The process of claim 1 including the step of concentrating the aqueous solution of levoglucosan by vacuum evaporation to a levoglucosan concentration of at least 70% by weight by evaporation using a vacuum of less than 50 mm. and a temperature of not over 70° F.

12. The process of separating aqueous mixtures derived from the pyrolysis of wood and containing dissolved levoglucosan and carbohydrate derived acids, the process comprising:

(a) adding lime in an amount sufficient to impart to the mixture a minimum pH of approximately 12, (b) separating the resulting insoluble calcium salts of the carbohydrate derived acids from the resulting aqueous solution of levoglucosan, (c) suspending the salts in an aqueous medium and adding sulfuric acid thereto for regenerating the carbohydrate derived acids and forming an accompanying precipitate of calcium sulfate, (d) separating the calcium sulfate precipitate from the regenerated carbohydrate derived acids, (e) concentrating the aqueous solution of levoglucosan by vacuum evaporation under a vacuum of at least 50 mm. and a temperature of not over 70° F. to a levoglucosan content of at least 70% by weight, (f) and crystallizing from the concentrated solution a solid crystalline levoglucosan product.

13. Process of claim 1 in which the compound is added to the mixture at a temperature of 35° to 60° F.

14. The process of claim 1 in which the compound is added to the mixture at a temperature of 35° to 60° F. and the mixture is thereafter heated to a temperature of 100° to 212° F. before the separation step.

References Cited

UNITED STATES PATENTS

| | | | |
|---|---|---|---|
| 2,697,701 | 12/1954 | Heritage et al. | 260—209 |
| 3,189,596 | 6/1965 | Brink | 260—209 |

LEWIS GOTTS, *Primary Examiner.*

JAMES O. THOMAS, Jr., *Examiner.*

J. R. BROWN, *Assistant Examiner.*